US010624087B2

United States Patent
Wiberg et al.

(10) Patent No.: US 10,624,087 B2
(45) Date of Patent: Apr. 14, 2020

(54) RADIO-NETWORK NODE, WIRELESS DEVICE AND METHODS FOR FEEDBACK-BASED RETRANSMISSION

(71) Applicant: Telefonaktiebolaget LM Ericsson (publ), Stockholm (SE)

(72) Inventors: Niclas Wiberg, Linköping (SE); Håkan Andersson, Linköping (SE); Andreas Bergström, Vikingstad (SE); Mattias Frenne, Uppsala (SE); Johan Furuskog, Stockholm (SE); Martin Hessler, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 95 days.

(21) Appl. No.: 15/503,779

(22) PCT Filed: Nov. 1, 2016

(86) PCT No.: PCT/SE2016/051068
§ 371 (c)(1),
(2) Date: Feb. 14, 2017

(87) PCT Pub. No.: WO2017/176183
PCT Pub. Date: Oct. 12, 2017

(65) Prior Publication Data
US 2018/0160425 A1 Jun. 7, 2018

Related U.S. Application Data

(60) Provisional application No. 62/319,331, filed on Apr. 7, 2016.

(51) Int. Cl.
*H04W 72/04* (2009.01)
*H04L 1/18* (2006.01)
(Continued)

(52) U.S. Cl.
CPC ....... *H04W 72/0446* (2013.01); *H04L 1/1614* (2013.01); *H04L 1/1819* (2013.01);
(Continued)

(58) Field of Classification Search
CPC . H04W 72/0446; H04L 1/1819; H04L 1/1854
See application file for complete search history.

(56) References Cited

U.S. PATENT DOCUMENTS

| 8,184,579 | B2 * | 5/2012 | Shen | H04W 72/042 |
| | | | | 370/329 |
| 2009/0046650 | A1 * | 2/2009 | Dalsgaard | H04L 1/1812 |
| | | | | 370/329 |

(Continued)

FOREIGN PATENT DOCUMENTS

| EP | 2117152 A1 | 11/2009 |
| EP | 2294743 A2 | 3/2011 |

(Continued)

*Primary Examiner* — Jael M Ulysse
(74) *Attorney, Agent, or Firm* — Murphy, Bilak & Homiller, PLLC

(57) ABSTRACT

A radio-network node handling a data transmission to a wireless device transmits data over a number of subframes to the wireless device, and a respective control part, associated with the data of each respective subframe, the respective control part comprising a feedback index indicating a transmission time of a feedback indication. The radio-network node receives from the wireless device the feedback indication in the feedback message common for the subframes of the data transmission according to the control parts of the transmitted subframes. The feedback indication indicates feedback for each subframe of the data transmission received and the number of NACKed subframes out of the number of subframes of the data transmission. The radio-network node receives the feedback message and then (Continued)

decides whether or not to retransmit any of the subframes based on the feedback indication therein.

36 Claims, 7 Drawing Sheets

(51) Int. Cl.
    *H04L 1/16*    (2006.01)
    *H04L 5/00*    (2006.01)
(52) U.S. Cl.
    CPC .......... *H04L 1/1854* (2013.01); *H04L 1/1864* (2013.01); *H04L 5/0055* (2013.01); *H04W 72/0406* (2013.01); *H04L 1/1861* (2013.01)

(56) References Cited

U.S. PATENT DOCUMENTS

| | | | | |
|---|---|---|---|---|
| 2009/0213769 A1* | 8/2009 | Shen | ................. | H04W 72/14 370/280 |
| 2009/0241004 A1* | 9/2009 | Ahn | ................. | H04L 1/1812 714/749 |
| 2010/0131814 A1* | 5/2010 | Chiu | ................. | H04L 1/1812 714/748 |
| 2010/0211845 A1* | 8/2010 | Lee | ................. | H04L 1/1854 714/749 |
| 2010/0325508 A1* | 12/2010 | Hu | ................. | H04L 1/1621 714/749 |
| 2011/0149774 A1* | 6/2011 | Chen | ................. | H04L 1/1854 370/252 |
| 2012/0294204 A1* | 11/2012 | Chen | ................. | H04L 1/1812 370/280 |
| 2013/0070702 A1* | 3/2013 | Ko | ................. | H04B 7/0623 370/329 |
| 2013/0176929 A1* | 7/2013 | Yang | ................. | H04L 1/1861 370/311 |
| 2014/0105076 A1* | 4/2014 | Yang | ................. | H04W 72/0413 370/280 |
| 2014/0376489 A1* | 12/2014 | Lee | ................. | H04L 5/0055 370/329 |
| 2015/0117272 A1* | 4/2015 | Gao | ................. | H04L 1/1861 370/280 |
| 2015/0188687 A1* | 7/2015 | Gao | ................. | H04L 1/1607 370/278 |
| 2015/0319776 A1* | 11/2015 | Seo | ................. | H04W 74/002 370/329 |
| 2016/0043854 A1* | 2/2016 | Damnjanovic | ....... | H04L 5/0048 370/329 |
| 2016/0242047 A1* | 8/2016 | Li | ................. | H04L 1/1861 |

FOREIGN PATENT DOCUMENTS

| | | |
|---|---|---|
| EP | 2916598 A1 | 9/2015 |
| EP | 2955870 A1 | 12/2015 |
| WO | 2009137646 A2 | 11/2009 |

\* cited by examiner

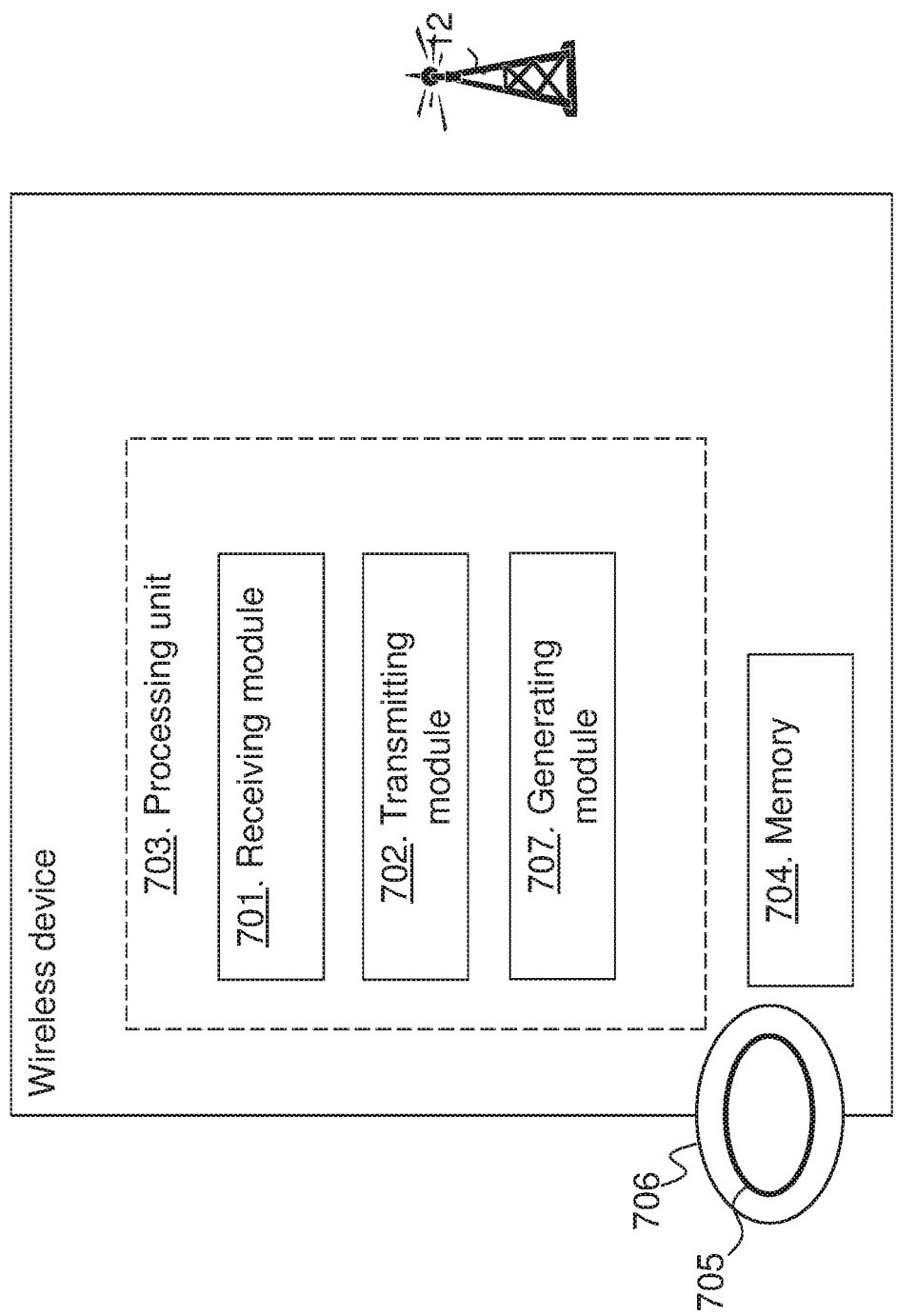

RADIO-NETWORK NODE, WIRELESS DEVICE AND METHODS FOR FEEDBACK-BASED RETRANSMISSION

TECHNICAL FIELD

Embodiments herein relate to a radio-network node, a wireless device and methods performed therein. In particular, embodiments herein relate to handling a data transmission from a radio-network node to the wireless device in a wireless communication network.

BACKGROUND

In a typical wireless communication network, wireless devices, also known as wireless communication devices, mobile stations, stations (STA) and/or user equipments (UE), communicate via a Radio-Access Network (RAN) to one or more core networks (CN). The RAN covers a geographical area which is divided into service areas or cell areas, which may also be referred to by a beam or a beam group which covers the area, with each service area or cell area being served by a radio-network node such as a radio-access node e.g. a Wi-Fi access point or a radio base station (RBS), which in some networks may also be denoted, for example, a "NodeB" or "eNodeB". A service area or cell area is a geographical area where radio coverage is provided by the radio-network node. The radio-network node communicates over an air interface operating on radio frequencies with the wireless device within range of the radio-network node.

A Universal Mobile Telecommunications System (UMTS) is a third generation (3G) telecommunication network, which evolved from the second generation (2G) Global System for Mobile Communications (GSM). The UMTS terrestrial radio-access network (UTRAN) is essentially a RAN using Wideband code-Division Multiple Access (WCDMA) and/or High-Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio-network nodes may be connected, e.g., by landlines or microwave, to a controller node, such as a radio-network controller (RNC) or a base-station controller (BSC), which supervises and coordinates various activities of the plural radio-network nodes connected thereto. This type of connection is sometimes referred to as a backhaul connection. The RNCs and BSCs are typically connected to one or more core networks.

Specifications for the Evolved Packet System (EPS), also called a Fourth-Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio-Access Network (E-UTRAN), also known as the Long-Term Evolution (LTE) radio-access network, and the Evolved Packet Core (EPC), also known as System Architecture Evolution (SAE) core network. E-UTRAN/LTE is a variant of a 3GPP radio-access network wherein the radio-network nodes are directly connected to the EPC core network rather than to RNCs. In general, in E-UTRAN/LTE the functions of an RNC are distributed between the radio-network nodes, e.g. eNodeBs in LTE, and the core network. As such, the RAN of an EPS has an essentially "flat" architecture comprising radio-network nodes connected directly to one or more core networks, i.e. they are not connected to RNCs. To compensate for that, the E-UTRAN specification defines a direct interface between the radio-network nodes, this interface being denoted the X2 interface. EPS is the Evolved 3GPP Packet-Switched Domain.

Advanced Antenna Systems (AASs) is an area where technology has advanced significantly in recent years and where we also foresee a rapid technology development in the years to come. Hence it is natural to assume that AASs in general and massive Multiple Input Multiple Output (MIMO) transmission and reception in particular will be a cornerstone in a future Fifth-Generation (5G) system.

In relation to the Advanced Antenna Systems (AAS), beam-forming is becoming increasingly popular and capable and it is not only for transmission of data but also for transmission of control information. This is one motivation behind the (relatively) new control channel in Long-Term Evolution (LTE) known as Enhanced Physical Downlink Control Channel (ePDCCH). When the control channel is beam-formed, the cost of transmitting the overhead control information can be reduced due to the increased link budget provided by the additional antenna gain.

Automatic repeat-request (ARQ) is an error-control technique used in many wireless networks. With ARQ, a receiver of data transmissions sends Acknowledgements (ACKs) or Negative Acknowledgments (NACKs) to inform the transmitter of whether each message has been correctly received. Incorrectly received messages, as well as messages that aren't acknowledged at all, can then be re-transmitted.

Hybrid ARQ (HARQ) combines ARQ with forward error-correction (FEC) coding of the data messages, to improve the ability of the receiver to receive and correctly decode the transmitted messages. As with conventional ARQ, receivers employing HARQ send ACKs and NACKs, as appropriate, after each attempt to decode a message. These ACKs and NACKs are referred to as "HARQ feedback."

For downlink HARQ transmissions in LTE today, HARQ feedback is sent from the wireless device, e.g. a User Equipment (UE) to the Network (NW) e.g. via a radio-network node on either Physical Uplink Control Channel (PUCCH) or Physical Uplink Shared Channel (PUSCH), depending on whether the wireless device has been scheduled for uplink PUSCH transmission or not. The NW such as the radio-network node may thereafter, on an individual HARQ-process basis, draw conclusions on whether the last HARQ reception for that process was successful or not Acknowledgement/Negative Acknowledgement (ACK/NACK) or even if the Downlink (DL) Assignment reception failed, i.e. the wireless device does not send any feedback also called Discontinuous Transmission (DTX).

The timing of the transmitted HARQ feedback in LTE is such that, for Frequency-Division Duplexing (FDD), the feedback from one HARQ Receive (RX) process is received in the Uplink (UL) in subframe n+4 if the corresponding DL transmission for that process was in subframe n, corresponding to 4 milliseconds (ms) in total. For Time-Division Duplexing (TDD), the delay from DL data transmission to UL feedback reception may be larger than four to cater for the half-duplex DL-UL split.

However, handling of a lot of feedback may be cumbersome and affect the performance of the wireless communication networks in a negative way.

SUMMARY

An object herein is to provide a mechanism that improves the manner of providing feedback such that it enhances the performance of a wireless communication network.

According to a first aspect of embodiments herein, the object is achieved by a method performed by a radio-network node for handling a data transmission from the radio-network node to a wireless device in a wireless communication network.

The radio-network node transmits data over a number of subframes to the wireless device, and a respective control part, associated with the data of each respective subframe, the respective control part comprising a feedback index indicating a transmission time of a feedback indication to be sent from the wireless device in a feedback message to be common for the subframes of the data transmission.

The radio-network node receives from the wireless device the feedback indication in the feedback message common for the subframes of the data transmission according to the control parts of the transmitted subframes. The feedback indication indicates feedback for each subframe of the data transmission received and the number of Negative Acknowledged, NACKed, subframes out of the number of subframes of the data transmission.

The radio-network node receives then decides whether or not to retransmit any of the subframes based on the feedback indication.

According to a second aspect of embodiments herein, the object is achieved by a method performed by a wireless device for handling a data transmission from a radio-network node to the wireless device in a wireless communication network. The wireless device receives from the radio-network node, data over a number of subframes and a respective control part associated with the data of each respective subframe. The respective control part comprises a feedback index, indicating a transmission time of a feedback indication to be sent from the wireless device in a feedback message to be common for the subframes of the data transmission.

The wireless device transmits to the radio-network node the feedback indication in the feedback message common for the subframes of the data transmission according to the control parts of the transmitted subframes. The feedback indication indicates feedback for each subframe of the data transmission received, and the number of Negative Acknowledged, NACKed, subframes out of the number of subframes of the data transmission.

According to a third aspect of embodiments herein, the object is achieved by a radio-network node for handling a data transmission to be transmitted from the radio-network node to a wireless device in a wireless communication network. The radio-network node is configured to:

Transmit data over a number of subframes to the wireless device, and a respective control part, associated with the data of each respective subframe, the respective control part comprising a feedback index indicating a transmission time of a feedback indication to be sent from the wireless device in a feedback message to be common for the subframes of the data transmission.

Receive from the wireless device the feedback indication in the feedback message common for the subframes of the data transmission according to the control parts of the transmitted subframes, which feedback indication indicates feedback for each subframe of the data transmission received and the number of Negative Acknowledged, NACKed, subframes out of the number of subframes of the data transmission.

Decide whether or not to retransmit any of the subframes based on the feedback indication.

According to a fourth aspect of embodiments herein, the object is achieved by a wireless device for handling a data transmission to be transmitted from a radio-network node to the wireless device in a wireless communication network 1. The wireless device being configured to:

Receive from the radio-network node, data over a number of subframes and a respective control part associated with the data of each respective subframe. The respective control part comprises a feedback index, indicating a transmission time of a feedback indication to be sent from the wireless device in a feedback message to be common for the subframes of the data transmission.

Transmit to the radio-network node, the feedback indication in the feedback message common for the subframes of the data transmission according to the control parts of the transmitted subframes. The feedback indication indicates feedback for each subframe of the data transmission received, and the number of Negative Acknowledged, NACKed, subframes out of the number of subframes of the data transmission.

Embodiments herein provide a manner of enabling feedback of a data transmission to a radio-network node in an efficient manner.

By indicating feedback for each subframe of the data transmission and the number of Negative Acknowledged (NACKed) subframes out of the number of subframes of the data transmission in the feedback message, the radio-network node can differentiate different types of non-ACKed subframes reported so that they can be transmitted or re-transmitted in an efficient way. The different types of non-ACKed subframes are: NACKed subframes where the wireless device attempted but failed decoding, and subframes with missed DL grant, where the wireless device never attempted decoding.

In case some subframes where NACKed, those subframes may be determined to be retransmitted with a new redundancy version, providing the performance benefits of incremental redundancy. If some subframes where lost because the wireless device did not receive the control message, those subframes may be retransmitted with the same redundancy version as the original transmission, which typically comprises the majority of the systematic bits, which increases the chance of decoding the retransmission correctly.

By letting the feedback index be associated with the time of the transmission of the feedback indication and the position in the feedback message, the feedback indication is provided back to the radio-network node in an efficient manner leading to an improved performance of the wireless communication network.

BRIEF DESCRIPTION OF THE DRAWINGS

Embodiments will now be described in more detail in relation to the enclosed drawings, in which:

FIG. 7 is a block diagram depicting a wireless device according to embodiments herein.

DETAILED DESCRIPTION

Figure 1:
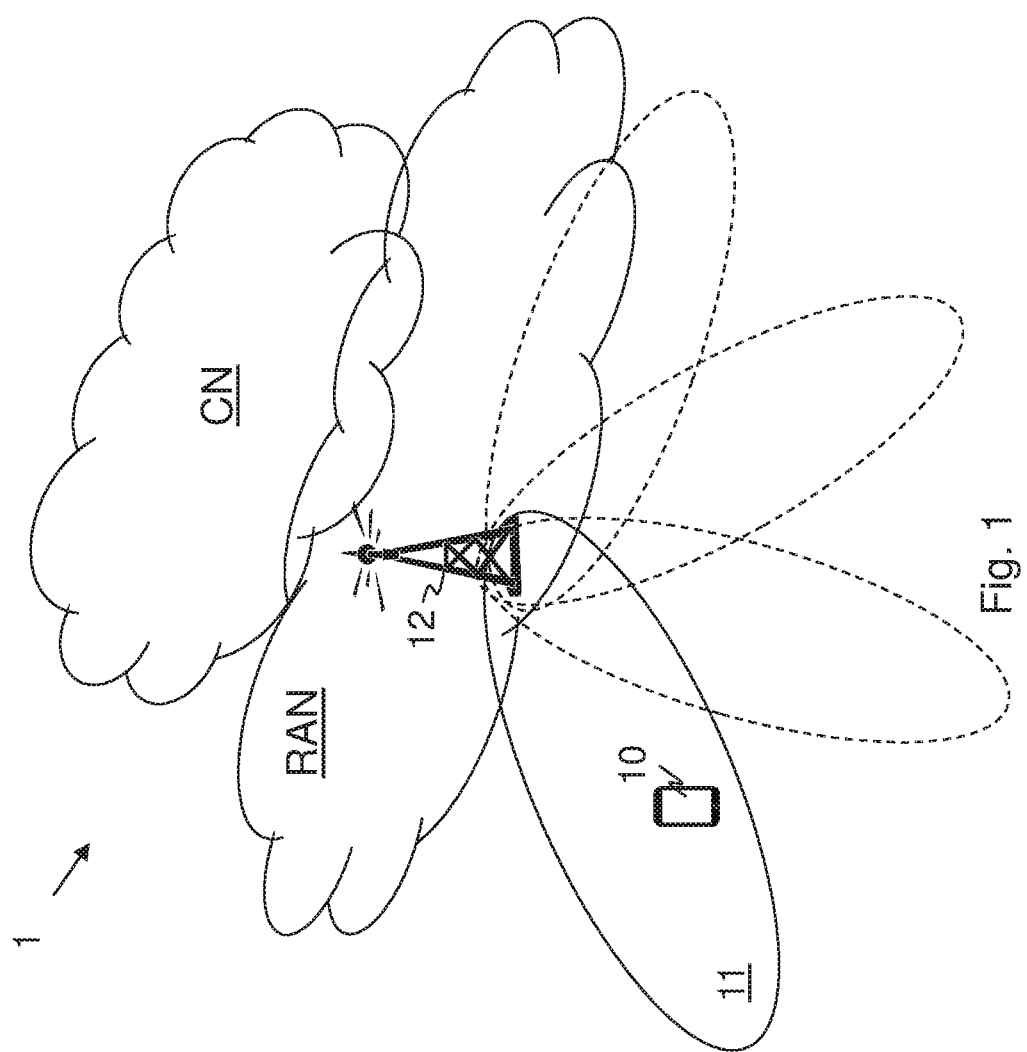
FIG. 1 is an overview depicting a wireless communication network according to embodiments herein.

Embodiments herein relate to wireless communication networks in general. FIG. 1 is a schematic overview depicting a wireless communication network 1. The wireless communication network 1 comprises one or more RANs and one or more CNs. The wireless communication network 1 may use a number of different technologies, such as Wi-Fi, Long-Term Evolution (LTE), LTE-Advanced, 5G, Wideband Code-Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminal, communicate via one or more Access Networks (AN), e.g. RAN, to one or more Core Networks (CN). It should be understood by the skilled in the art that "wireless device" is a non-limiting term which means any terminal, wireless communication terminal, user equipment, Machine-Type Communication (MTC) device, Device-to-Device (D2D) terminal, or node e.g. smart phone, laptop, mobile phone, sensor, relay, mobile tablets or even a small base station communicating within a cell.

The wireless communication network 1 comprises a radio-network node 12 providing radio coverage over a geographical area, a service area 11, which may also be referred to by a beam or a beam group which covers the area, of a first radio-access technology (RAT), such as 5G, LTE, Wi-Fi or similar. The radio-network node 12 may be a transmission and reception point e.g. a radio-access network node such as a Wireless Local-Area Network (WLAN) access point or an Access-Point Station (AP STA), an access controller, a base station, e.g. a radio base station such as a NodeB, an evolved Node B (eNB, eNode B), a base transceiver station, a radio remote unit, an Access-Point Base Station, a base station router, a transmission arrangement of a radio base station, a stand-alone access point or any other network unit capable of communicating with a wireless device within the service area served by the first access point 12 depending e.g. on the first radio-access technology and terminology used. The radio-network node 12 may be referred to as a serving radio-network node and communicates with the wireless device 10 with Downlink (DL) transmissions to the wireless device 10 and Uplink (UL) transmissions from the wireless device 10.

The wireless device 10 provides feedback, e.g. HARQ feedback relating to a data transmission, the data being transmitted over a shared channel such as e.g. a Physical Downlink Shared Channel (PDSCH), from the radio-network node 12. The data transmission comprises a number of subframes, each with an associated control part, e.g. a DL grant, and a data part. The data transmission generates or triggers a corresponding HARQ feedback indication, e.g. ACK/NACK, for each data part. The control parts are transmitted over a control channel, e.g. Physical Downlink Control Channel (PDCCH) or ePDCCH, while the data is sent over a data channel e.g. the PDSCH. The HARQ feedback may be transmitted as part of the Uplink Control Information (UCI) on a specific Physical Uplink Control Channel (PUCCH) or multiplexed onto the Physical Uplink Data Channel (PUSCH). The specific physical uplink control channel may be referred to as xPUCCH.

In, e.g. a 5G system, the specific UL control channel, e.g. xPUCCH, may be transmitted on one Orthogonal Frequency-Division Multiplexing (OFDM) symbol. This channel will provide a limited number of bits, e.g. 1 to 6 information bits, by either having a number of fixed formats, similar to LTE PUCCH format 1/1a/1b, or having one single format, still allowing for a flexible number of information bits.

Embodiments herein relate to a compact HARQ feedback on an UL control channel such as the xPUCCH, e.g. each DL grant reserves a resource in the UL control channel for the feedback e.g. one bit for indicating ACK or NACK. According to embodiments herein the DL grant, also called PDSCH grant, may comprise a feedback index or feedback index value. E.g. the DL grant may comprise Downlink Control Information (DCI) fields that comprise the feedback Index of two bits, 0 . . . 3. A feedback index of two bits, 0 . . . 3, means that they indicate which of four possible HARQ resources, with corresponding delays, to use for feedback of this transmission. When using the term "feedback index" the different HARQ resources are being pointed out, indexed, and when using the terminology "feedback index value" the two bits are interpreted as numerical values, typically 0, 1, 2, and 3. The feedback index value is indicating a delay when to transmit the reserved feedback part and the feedback index may be associated with a position in the reserved feedback part. Hence, the feedback index may determine a position of ACK/NACK of a feedback message. The feedback index value determines a feedback delay, also called offset value. E.g. a feedback index value is added to a semi-statically configured minimum feedback delay value. This minimum feedback delay value may be related to capability of the wireless device 10 to process received data. The term feedback Index thus relates to a position in the feedback message while a feedback Index value relates to the numerical value obtained when interpreting the feedback index as a number, e.g. in the range 0 . . . 3. In the following the terms feedback index and feedback index value may be used interchangeably when it is clear from the context which interpretation that is applicable.

Thus, embodiments herein provide a mechanism that efficiently sets up the configuration of the feedback by e.g. providing information when and where in the feedback message the feedback is provided in a compact feedback structure. Compact feedback structure herein meaning that feedback for a number of subframes of a data transmission are provided simultaneously back to the radio-network node 12 in the same feedback message.

If a downlink transmission is not ACKed by a wireless device, it may be either because the wireless device 10 tried to decode the transmission but failed (the NACK case), or because the wireless device 10 never tried to decode the transmission because the control message was lost. It may be beneficial for the radio-network node 12 to handle these two cases differently: In the NACK case the wireless device 10 will have stored the received signal in its HARQ buffer, so that it may be soft combined with a retransmission using an efficient scheme for incremental redundancy. In the case where the control message was lost, it is more beneficial to let the retransmission be a copy of the first transmission since there is nothing to combine with. If the radio-network node 12 does not know which case occurred, it will have to perform the same type of retransmission in both cases, which will reduce performance in one of the cases. When encoding a message redundant bits are added which may help a receiver to correct errors that occurred on the channel. The resulting channel message will contain the original message, the data bits, and a number of redundant bits. Typically, all redundant bits generated in the encoding process at a transmitter side are not actually transmitted, but stored for possible retransmissions. The initial transmission includes the data bits, the original message, plus a number of redundant bits. In the case of a retransmission when nothing is stored in the HARQ buffer on the receiving side, the control message was lost so the receiver was not aware of the transmission taking place, it is beneficial to retransmit the same transmission. However, in case of a failed decoding attempt, it is often better to let the retransmission comprise additional redundancy bits. Different so-called redundancy versions may be specified that detail which redundant bits are contained in which redundancy version.

According to embodiments herein, the compact HARQ feedback further comprises information about the number of NACKed subframes reported out of the number of subframes of the data transmission. E.g. the wireless device 10 encodes the number of NACKed transmissions in the compact HARQ feedback comprised in the feedback message, along with an ACK/NACKbit for each transmission. For example, one bit per transmission where 1=ACK, and 0=NACK or "DCI not detected". This is since the default value of 0 will be what is transmitted if the DCI is not detected. This means that the network cannot differentiate between a situation when the decoding of a transmission failed, resulting in a NACK, and the situation when the downlink control message was not received/correctly decoded, resulting in a "DCI not detected". Both these instances are reported as NACK although they are the results of different failure types.

This is reported so that the radio-network node 12 shall be able to determine which subframes need to be retransmitted, and moreover, so that it can determine whether it is best to retransmit the original transmission or to use a new redundancy version.

The wireless device 10 may be configured to know where in the feedback message this information is to be added. The radio-network node 12 may be configured to know where in the feedback message this information is to be found. In other embodiments, the position of this information may be indicated in the feedback index.

Furthermore, two DL transmissions, e.g. xPDSCH transmissions, may occur simultaneously, each DL transmission transmitting its own data over subframes. Feedback is needed for both xPDSCH transmissions and embodiments herein also relate to one HARQ feedback message containing feedback for simultaneous xPDSCH transmissions.

Thus, embodiments herein provide a mechanism that efficiently sets up the configuration of the feedback i.e. providing information when and where, in the feedback message such as the UL control message, the feedback is provided in a compact feedback structure. Compact feedback structure herein meaning that feedback for a number of subframes carrying data of a data transmission are provided simultaneously together with information about the number of NACKed subframes reported out of the number of subframes of the control message back to the radio-network node 12.

The above method is performed by the radio-network node 12. As an alternative, a Distributed Node (DN) and functionality, e.g. comprised in a cloud may be used for performing the method.

Figure 2:
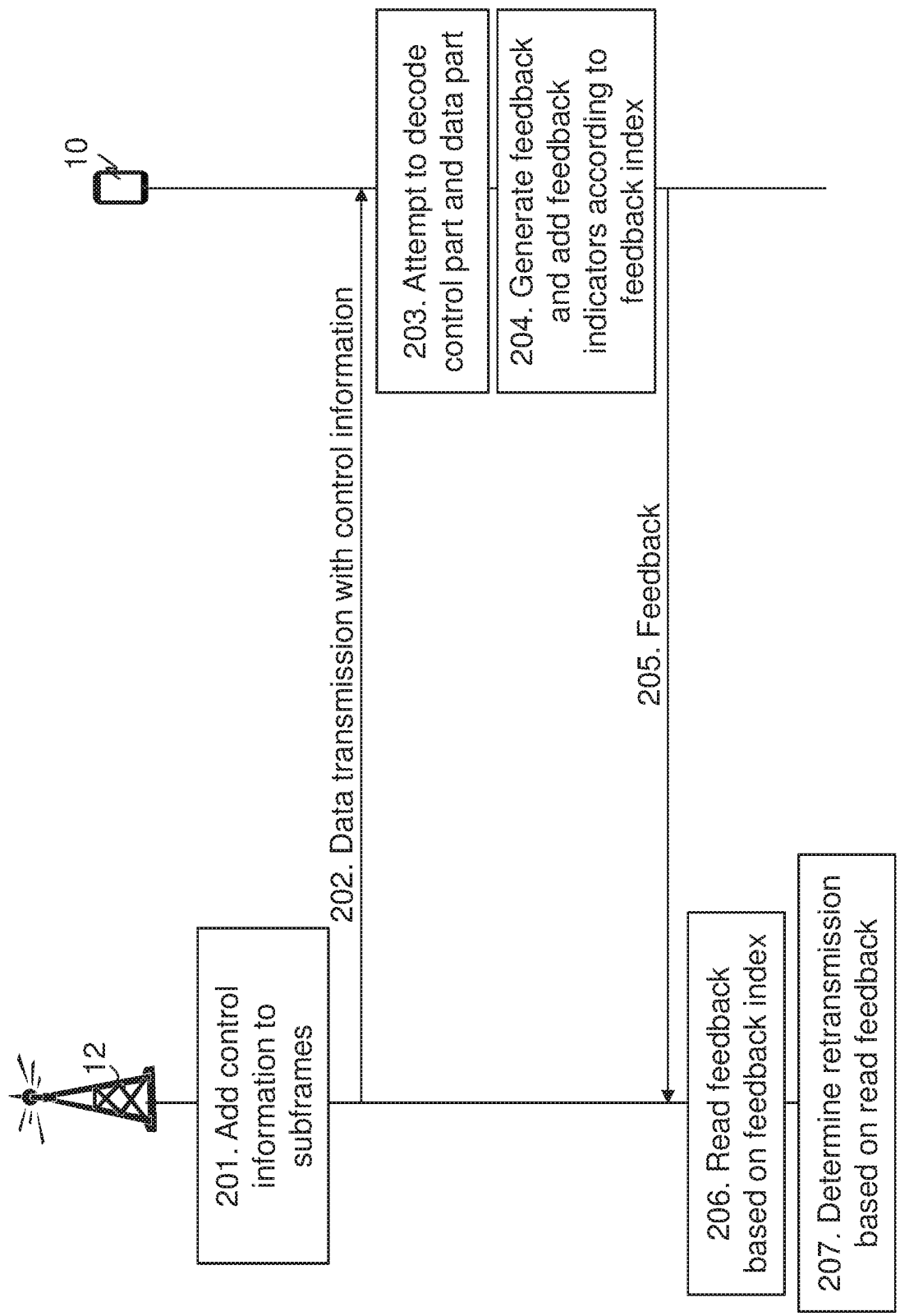
FIG. 2 is a combined flowchart and signalling scheme according to embodiments herein.

FIG. 2 is a combined flowchart and signaling scheme according to embodiments herein.

Action 201. According to some embodiments, the radio-network node 12 is configured to indicate in a control part associated with data, such as a DL grant, in a data transmission over a PDSCH for the wireless device 10, when and where to transmit a compact feedback of the data transmission. Thus, according to an example scenario, the radio-network node 12 is to transmit data to the wireless device 10 and may add control information to the DL transmission. The control information, e.g. DCI, comprises an index value also referred to as feedback index or feedback index value. Note that the terms feedback index and feedback index value may be used interchangeably herein. The feedback index indicates a delay defining when in time to add feedback to a feedback message also referred to as a response message. This means that upon receiving a particular subframe the wireless device 10 shall wait for a given time, which is the transmission time such as the delay or the time offset before sending the feedback regarding the particular subframe in a response message. To be able to send the feedback of several subframes of the data transmission simultaneously in a feedback message, which subframes are received by the wireless device 10 at different points in time, said the transmission time such as the delay or the time offset for the different subframes need to be different. The feedback index further indicates where in the message the feedback is placed, e.g. a position number. A first delay may be defined to a zero value, wherein the zero value is associated with a preconfigured and/or a default value at the wireless device 10 such as e.g. 4 ms. As the delay or offset may be defined in subframes, a subframe previously received may have a feedback index set to '1' indicating a delay of default and/or preconfigured value plus one subframe. Simultaneously, the feedback index according to embodiments herein indicate a position in the feedback message such as the UL control message, hence, value zero indicates position zero, value one indicates position one etc., where position zero is a first value read in the UL control message. Thus, value zero of the feedback index e.g. in the DCI, indicates the feedback of the subframe to be transmitted at a default offset time, and in position zero in the UL control message.

The feedback index may further indicate where in the message the feedback is placed, e.g. a position number where to find information about the number of NACKed subframes reported.

This will be described more in detail and exemplified below.

Action 202. The radio-network node 12 transmits the data transmission, wherein data is mapped to subframes, each subframe with associated control information e.g. the DL grant.

Action 203. The wireless device 10 attempts to decode the DL control part and the DL data transmissions, e.g. a number of consecutive subframes each comprising a control part with a respective feedback index, and a data part. In case the wireless device 10 succeeds in decoding one DL control part the wireless device 10 further attempts to decode the DL data in the data part.

Action 204. The wireless device 10 generates feedback in accordance with the decoding attempt and in a compact manner. In case the wireless device 10 succeeds in decoding one DL control part and successfully decodes the data part in the subframe, an ACK is generated. In case the data part is not successfully decoded a NACK is generated. If the control part is not decoded the wireless device 10 will as default transmit NACK as feedback for that subframe.

In an example scenario, the wireless device 10 may be configured to aggregate feedback of e.g. four subframes. However, in some embodiments the wireless device 10 may be configured to aggregate feedback of more or less than four subframes. In the example scenario, the wireless device 10 decodes the data parts of the first and fourth subframes successfully but fails decoding the data part of the second subframe and does not detect the control part of the third subframe.

A positive feedback, ACK, is generated for the fourth subframe since it was successfully decoded. The feedback index value is zero in the fourth subframe. Thus, this ACK is added at a default offset in time of the feedback information at position zero of the feedback message, e.g. an UL control message is generated.

No feedback is generated for the third subframe since the wireless device 10 did not detect the control part of the third subframe. However, a negative feedback, NACK, is transmitted by default when no decoding has been attempted for this subframe.

A negative feedback, NACK, is generated for the second subframe since the wireless device 10 failed to decode the data part of the second subframe. As the feedback index value is two for the second subframe this NACK is added at an offset of 2 subframes+the default offset value and at position two in the aggregated feedback message.

Similarly, a positive feedback, ACK, is generated for the first subframe. As the feedback index value is three for the first subframe this ACK is added at an offset of three subframes+the default offset value and at position three in the aggregated feedback message.

If the feedback is one bit long a value of one may indicate ACK and a value of zero may indicate NACK or DTX.

According to embodiments herein, two of the bits, may be used for indicating the number of NACKs or the number of non-ACKs. For example:

0 or 4 NACKs: =(0, 0)
1 NACK: =(1, 0)
2 NACKs: =(0, 1)
3 NACKs: =(1, 1)

As mentioned above, the compact HARQ feedback according to embodiments herein further comprises information about the number of NACKed subframes reported. However, in some alternative embodiments, the indicated NACKed subframes out of the number of subframes of the data transmission may as well be indicated by specifying the number of subframes of the data transmission received by the wireless device (10) in the feedback index. The indicated number of NACKed subframes out of the number of subframes is derivable from the number of subframes of the data transmission received by the wireless device (10) minus the number of ACKed subframes out of the subframes of the data transmission.

This may be reported e.g. at position four and five in the aggregated feedback message or any other suitable position. This information is an advantage to know for the radio-network node 12 since both negative feedback, i.e. NACK, and no feedback are reported as zero and the information about the number of NACKed subframes reported helps to differentiate these types of reported zeros. This enables the radio-network node 12 to make the best choice in terms of what types of retransmission to perform, e.g. whether to retransmit the original transmission or to use a different redundancy version.

According to the example scenario above, the specific information about the number of NACKed subframes reported, which in this example scenario is one, is included in the generated compact HARQ feedback. This NACK is for the second subframe since failing to decode the data part of the second subframe.

Action 205. The generated feedback is transmitted from the wireless device 10 back to the radio-network node 12 as indicated in the control information of the subframes.

Action 206. The radio-network node 12 receives and reads the feedback in the feedback message, e.g. ACK at positions zero and position three for the first data transmission, based on the knowledge of the feedback index value previously sent. Thus, the radio-network node 12 knows which value in the UL control message relates to which data of the subframes.

The radio-network node 12 knows the number of transmissions sent.

In the feedback message the radio-network node 12 may see
  at position zero in the feedback message a value of one (1), is reported for the fourth subframe, a value of one indicates ACK,
  at position one in the feedback message a value of zero (0), is reported for the third subframe, a value of zero indicates NACK or DTX,
  at position two in the feedback message a value of zero (0), is reported for the second subframe, a value of zero indicates NACK or DTX
  at position three in the feedback message a value of one (1), is reported for the first subframe, a value of one indicates ACK
  at positions four and five in the feedback message, values of one, zero (1,0) are reported for the number of NACKed subframes. Values of one, zero indicate one of the subframes are reported NACK. In some alternative embodiments as mentioned above, the indicated NACKed subframes out of the number of subframes of the data transmission is indicated by the number of subframes of the data transmission received by the wireless device (10) in the feedback message, which in the example scenario is three. This may be reported in positions four and five in the feedback message with e.g. the values of one, one (1,1) as this is the conventional representation of the value three.

The radio-network node 12 counts the number of reported ACKs which is two, and adds the number of NACKed subframes which is one, reported according to the information received in the feedback message. Which, according to this example scenario, means that two plus one equals three, 2+1=3.

Or as an alternative, reads the indication of the number of subframes of the data transmission received by the wireless device 10 in the feedback message, which in the example scenario is three.

If the sum of reported ACKs and the number of NACKed subframes, or in the alternative embodiment, if the indication of the number of subframes of the data transmission received by the wireless device 10, is less than number of transmissions transmitted by the radio-network node 12, which it is in the example scenario since three is less than four, the radio-network node 12 assumes that a DCI error occurred for one of the two. With DCI error is meant that a control message such as a DL grant was transmitted by the radio-network node 12 but not received by the wireless device 10, resulting in that the wireless device 10 did not even try to decode the corresponding data transmission. In this case the wireless device 10 transmits a default value corresponding to NACK in the feedback position corresponding to this subframe.

It is often not possible to know which DCI was lost. Therefore, the radio-network node 12 may assume that all non-ACKed transmissions experienced DCI loss. As a consequence, the radio-network node 12 may choose to resend the original transmission for each subframe that was not reported with an ACK. This may be suboptimal in some cases where some subframes were actually NACKed while others experienced DCI loss, but those cases are typically relatively rare so optimal behavior is not required.

The reason to treat a NACKed subframe differently from a subframe with DCI loss is that different redundancy versions may be optimal in these two cases. Redundancy version refers to different subsets of the encoded message. Conventionally, redundancy version 0 contains the original message (the data bits) plus some redundancy bits. Subsequent redundancy versions contain different subsets (which may be partially overlapping) of any additional redundancy bits that were generated in the encoding process. The wording "redundancy versions" when used herein means that these different subsets are referred to. In particular, in the case of a NACK the wireless device 10 will have stored the received signal in its HARQ buffer, enabling soft combining with a retransmission. Soft combining, a.k.a. "Chase combining", means that the analog values corresponding to the received message bits in the demodulator may be added together for values representing the same message bit. This may increase the likelihood of correct decoding as the new value is essentially the average of two or more transmission attempts. The wording "soft combining" when used herein means that several transmissions of the same redundancy version are added together before decoding is attempted. However, in the context of redundancy versions and retransmissions a more prominent property called "incremental redundancy" is often more important than soft combining. Incremental redundancy means that each retransmission should first aim to provide new redundancy bits that have not been transmitted before. It is generally more advantageous to have received as many different redundancy bits as possible, than it is to have the same redundancy version transmitted several times and using soft combining. This increases the probability of correct decoding. However, depending on the code rate used, i.e., the number of data bits (systematic bits) in relation to the number of redundancy bits, the redundancy versions may partially overlap, in which case soft combining of the overlapping bits is beneficial to use.

Therefore, it is beneficial to use a different redundancy version for the retransmission in the case of a NACK. Conversely, in the case of DCI loss no incremental redundancy is possible, so it is better to retransmit the original redundancy version, which typically comprises more systematic bits. Having the systematic bits over the redundancy bits increases the likelihood of correct decoding, and for some encoding schemes it is even essential.

Action 207. The radio-network node 12 then determines whether to retransmit data of the different subframes based on the read feedback.

Figure 3:
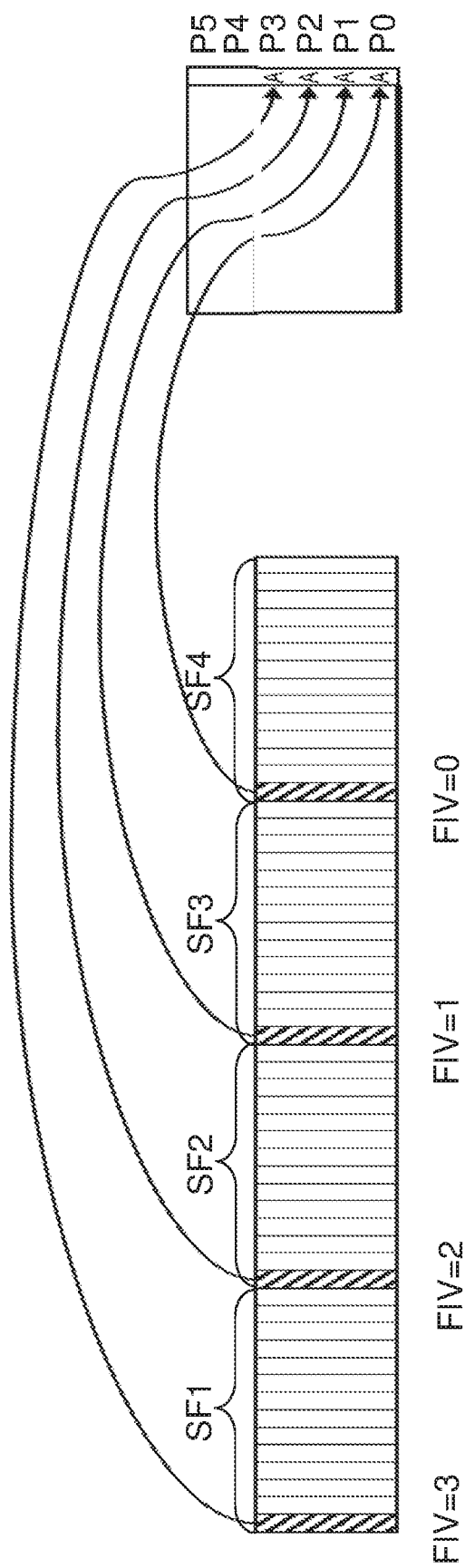
FIG. 3 is a block diagram depicting positioning of feedback indication in a feedback message according to embodiments herein.

FIG. 3 is a block diagram depicting an efficient manner of mapping feedback indications to a feedback message such as an UL control message in an example according to embodiments herein, e.g. a (x)PUCCH, at least partly based on the Feedback Index Value (FIV). Feedback for a number of transmission blocks or SubFrames (SFs) carrying data are aggregated into one feedback occasion.

A fourth subframe, SF4, out of the number of SFs for which feedback is aggregated into one feedback occasion comprises a FIV of zero indicating a time offset or delay of a default/configured value and also indicating a first position also called position zero, P0.

A third SF, SF3, out of the number of SFs comprises a FIV of one indicating a time offset or a delay of one subframe plus the offset of the default/configured value for the feedback indication to be transmitted. The feedback indication is to be indicated at a second position also called position one, P1.

A second SF, SF2, out of the number of SFs comprises a FIV of two indicating a time offset or delay of two subframes plus the offset of the default/configured value for the feedback indication of this subframe to be transmitted. The feedback indication is to be indicated at a third position also called position two, P2.

A first SF, SF1, out of the number of subframes comprises a FIV of three indicating a time offset or delay of three subframes plus the offset of the default/configured value for the feedback indication of this subframe to be transmitted. The feedback indication is to be indicated at a fourth position also called position three, P3.

In the control part associated with the subframe carrying data, Downlink grant DCI fields may comprise Feedback index/delay of 2 bits.

HARQ feedback encoding may be according to LTE PUCCH format 3, which supports up to 22 bits. Six bits may be used for HARQ feedback: $a_0, a_1, a_2, a_3, a_4, a_5$, where bits $a_0, a_1, a_2, a_3$: are ACK bits for up to four transmissions or subframes. For example, ACK at feedback index $i \Rightarrow a_i=1$ and NACK or no transmission at feedback index $i \Rightarrow a_i=0$.

The feedback relating to an indication of the number of NACKs or the number of non-ACKs out of the transmitted subframes or as the alternative, the number of subframes of the data transmission that was actually received by the wireless device 10, may be indicated at a fifth position also called position four, P4 and at a sixth position also called position five, P5.

Figure 4:
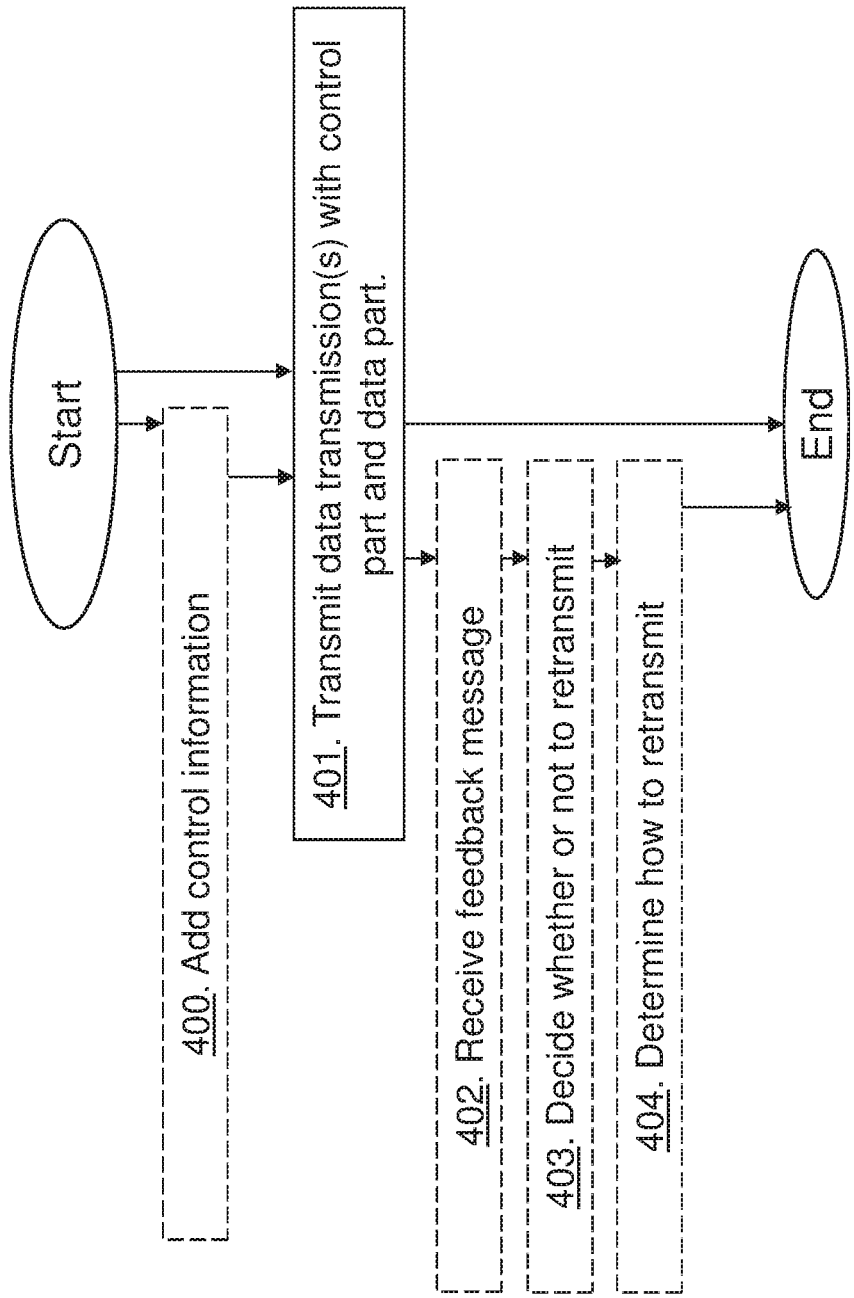
FIG. 4 is a schematic flowchart depicting a method performed by a radio-network node according to embodiments herein.

According to embodiments herein, two of the bits, bits $a_4$, $a_5$: are used for indicating the number of NACKs or the number of non-ACKs. For example:
  0 or 4 NACKs: $(a_4, a_5)=(0, 0)$
  1 NACK: $(a_4, a_5)=(1, 0)$
  2 NACKs: $(a_4, a_5)=(0, 1)$
  3 NACKs: $(a_4, a_5)=(1, 1)$ According to alternative embodiments herein, two of the bits, bits $a_4$, $a_5$: are used for indicating the number of subframes of the data transmission that was actually received by the wireless device 10. For example:
  0 or 4 received bits: $(a_4, a_5)=(0, 0)$
  1 received bits: $(a_4, a_5)=(1, 0)$
  2 received bits: $(a_4, a_5)=(0, 1)$
  3 received bits: $(a_4, a_5)=(1, 1)$ FIG. 4 is a flowchart depicting a method performed by the radio-network node 12. Example embodiments of a method performed by a radio-network node 12 for handling a data transmission from the radio-network node 12 to a wireless device 10 in a wireless communication network 1 will be described in a general way with reference to a flowchart depicted in FIG. 4.

The method comprises the following actions, which actions may be taken in any suitable order. Actions that are optional are presented in dashed boxes in FIG. 4.

Action 400

According to an example scenario, the radio-network node 12 is to transmit data to the wireless device 10 and may add control information to a data transmission. The control information, e.g. DCI, comprises a feedback index.

Action 401

The radio-network node 12 transmits data over a number of subframes to the wireless device 10, and a respective control part, such as a DL grant, associated with the data of each respective subframe: The respective control part comprises the feedback index indicating a transmission time of a feedback indication to be sent from the wireless device 10 in a feedback message. The feedback message is to be common for the subframes of the data transmission. The indication of the transmission time of the feedback message to be sent from the wireless device 10 may comprise a time offset. The subframes are sent at different points in time therefore the indicated transmission times for the feedback is different for different subframes. The transmission time is indicated such that the feedback from each respective subframe can be sent at the same time in the same feedback message.

Action 402

The radio-network node 12 receives the feedback indication in the feedback message from the wireless device 10 according to the control parts of the transmitted subframes. The feedback message is common for the subframes of the data transmission. The feedback indication indicates feedback for each subframe of the data transmission received, and the number of NACKed subframes out of the number of subframes of the data transmission.

The feedback index may further indicate a position for the feedback indication in the feedback message.

Action 403

The radio-network node 12 decides whether or not to retransmit any of the subframes based on the feedback indication.

Action 404

Feedback corresponding to NACK is received from the wireless device 10 for subframe where no control part is detected.

In some embodiments, if decided to retransmit any of the subframes, the radio-network node 110 determines how to retransmit the subframe based on the feedback indication.

The radio-network node 110, may determine how to retransmit the subframe based on the feedback indication by: Determine whether to retransmit the original transmission or to use a new redundancy version, and if determining to use a new redundancy version, selecting which redundancy version to use for the retransmission of the subframe, based on the feedback indication.

The determining how to retransmit the subframe may comprise: Selecting which redundancy version to use for the retransmission of the subframe, based on the feedback for each subframe of the data transmission in the feedback indication and the number of NACKed subframes out of the number of subframes of the data transmission in the feedback indication.

The determining how to retransmit the subframe may comprise: selecting which redundancy version to use for the retransmission, based on: (1) The actual number of transmissions made for which HARQ feedback is expected, also referred to as scheduled, in the feedback indication, (2) the number of ACKed subframes out of the number of subframes of the data transmission in the feedback indication, and (3) the number of NACKed subframes in the feedback indication. The actual number of transmissions made for which HARQ feedback is expected, means that for each of these transmitted subframes a feedback is expected and may also be referred to as the actual number of transmissions made for which HARQ feedback is scheduled since the scheduling of each of these subframes also scheduled, in the same control message, the HARQ feedback message to be transmitted.

The determining how to retransmit the subframe may comprise: If the number of ACKed plus the number of NACKed subframes equal the actual number of transmissions, determining that any retransmission is to be made with a new redundancy version, otherwise any retransmission is to be made with the previously used redundancy version. That a redundancy version is new means that it is a new subset of redundancy bits compared to what has previously been transmitted. However, a partial overlap between redundancy versions may exist.

As mentioned above, in some embodiments the indicated NACKed subframes out of the number of subframes of the data transmission is indicated by specifying the number of subframes of the data transmission received by the wireless device 10 in the feedback index. The indicated number of NACKed subframes out of the number of subframes is derivable from the specified number of subframes of the data transmission received by the wireless device 10 minus the number of ACKed subframes out of the subframes of the data transmission.

In these embodiments the determining how to retransmit the subframe comprises: If the indicated number of subframes of the data transmission received by the wireless device 10 equals the actual number of transmissions transmitted by the radio-network node 12, then any retransmissions are determined to be made with new redundancy versions, otherwise any retransmissions are made with the previously used redundancy version.

Figure 5:
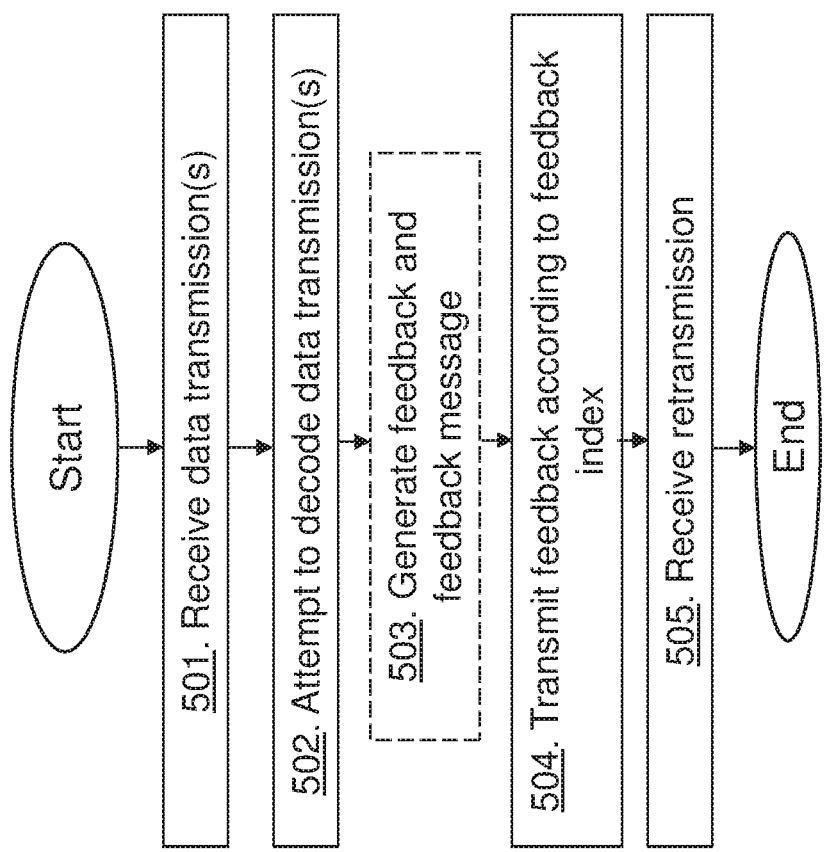
FIG. 5 is a schematic flowchart depicting a method performed by a wireless device according to embodiments herein.

FIG. 5 is a flowchart depicting a method performed by the wireless device. Example embodiments of the method performed by the wireless device 10 for handling a data transmission, such as transmission of data in a number of subframes, from the radio-network node 12 to the wireless device 10 in a wireless communication network 1, will be described in a general way with reference to a flowchart depicted in FIG. 5.

The method comprises the following actions, which actions may be taken in any suitable order. Actions that are optional are presented in dashed boxes in FIG. 5.

Action 501

The wireless device 10 receives from the radio-network node 12, data over a number of subframes, and a respective control part, such as a DL grant, associated with the data of each respective subframe. The respective control part comprises a feedback index, indicating a transmission time of a feedback indication to be sent from the wireless device 10 in a feedback message to be common for the subframes of the data transmission.

The indication of the transmission time of the feedback message to be sent from the wireless device 10 may comprise a time offset.

In some embodiments, the feedback index further indicates a position for the feedback indication in the feedback message.

Action 502

The wireless device 10 may then attempt to decode the control part and the data in the data transmission, e.g. a number of consecutive subframes each comprising a control part with a respective feedback index, and a data part. In case the wireless device 10 succeeds in decoding one control part the wireless device further attempts to decode the data in the corresponding data part.

Action 503

In some embodiments, the wireless device 10 generates feedback in the feedback message common for the subframes of the data transmission according to the control parts of the transmitted subframes and in accordance with decoding attempts of each of the received subframes of the data transmission. A default feedback corresponding to a NACK is generated for subframes in which no control part is detected.

Action 504

The wireless device 10 transmits to the radio-network node 12, the feedback indication in the feedback message common for the subframes of the data transmission according to the control parts of the transmitted subframes. The feedback indication indicates feedback for each subframe of the data transmission received, and the number of NACKed subframes out of the number of subframes of the data transmission.

The indicated NACKed subframes out of the number of subframes of the data transmission may be indicated by specifying the number of subframes of the data transmission received by the wireless device 10 in the feedback index. The indicated number of NACKed subframes out of the number of subframes is derivable from the specified number of subframes of the data transmission received by the wireless device 10 minus the number of ACKed subframes out of the subframes of the data transmission.

Action 505

The wireless device 10 may receive from the radio-network node 12, a re-transmission of any of the number of subframes based on the feedback indication.

Figure 6:
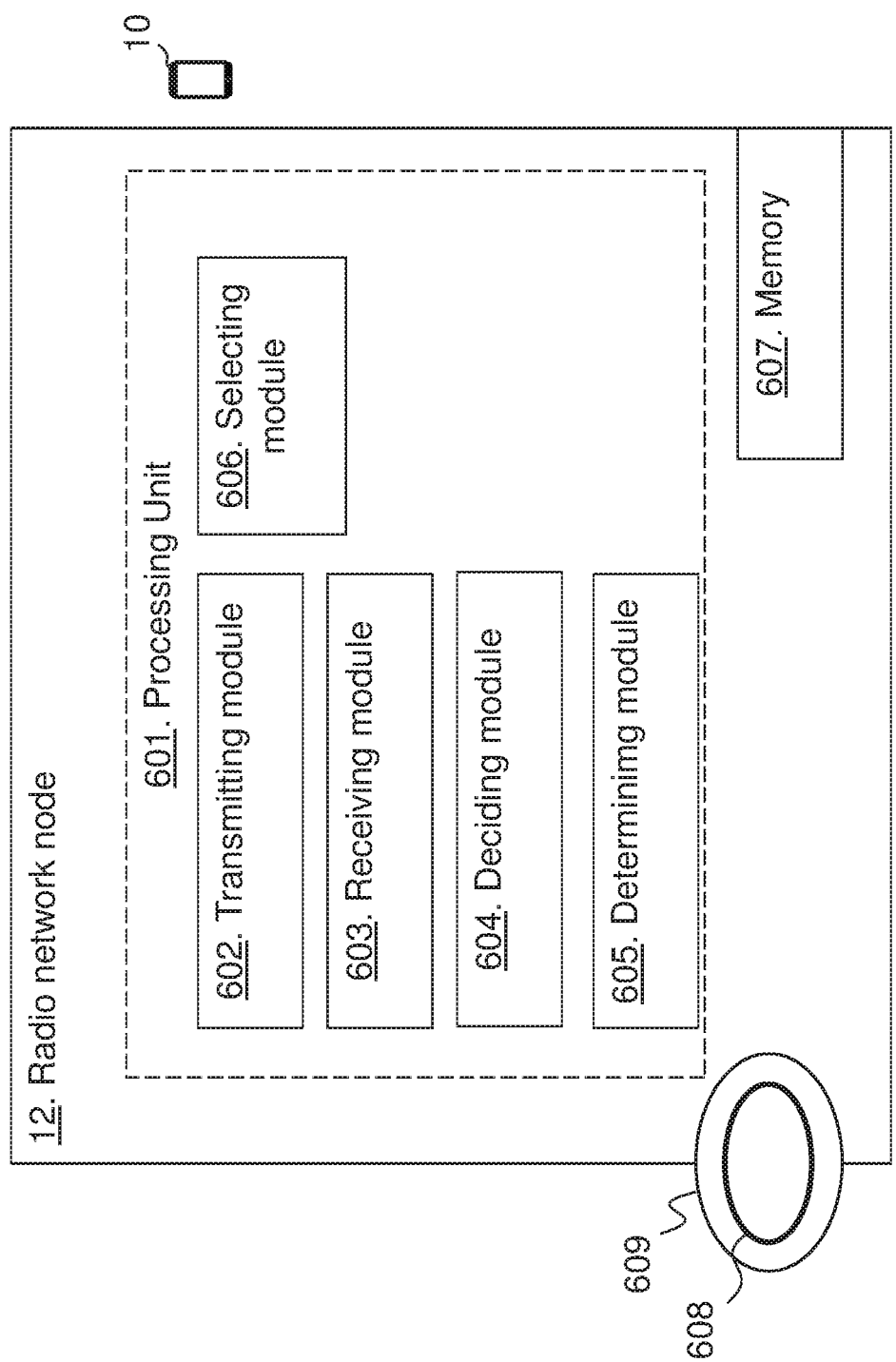
FIG. 6 is a block diagram depicting a radio-network node according to embodiments herein.

FIG. 6 is a schematic block diagram depicting the radio-network node. To perform the method actions for handling a data transmission to be transmitted from the radio-network node 12 to a wireless device 10 in a wireless communication network 1, the radio-network node 12 may comprise the following arrangement depicted in FIG. 6.

The radio-network node 12 is configured to, e.g. by means of a transmitting module 602 configured to, transmit data over a number of subframes to the wireless device 10, and a respective control part, associated with the data of each respective subframe. The respective control part comprises a feedback index indicating a transmission time of a feedback indication to be sent from the wireless device 10 in a feedback message to be common for the subframes of the data transmission.

The indication of the transmission time of the feedback message to be sent from the wireless device 10 may comprise a time offset.

The feedback index may further be adapted to indicate a position for the feedback indication in the feedback message.

The radio-network node 12 is further configured to, e.g. by means of a receiving module 603 configured to, receive from the wireless device 10 the feedback indication in the feedback message common for the subframes of the data transmission according to the control parts of the transmitted subframes. The feedback indication indicates feedback for each subframe of the data transmission received and the number of NACKed subframes out of the number of subframes of the data transmission.

The radio-network node 12 is configured to, e.g. by means of a deciding module 604 configured to, decide whether or not to retransmit any of the subframes based on the feedback indication.

The radio-network node 12 may further be configured to, e.g. by means of a determining module 605 configured to, determine how to retransmit the subframe based on the feedback indication, if decided to retransmit any of the subframes.

In some embodiments, the radio-network node 12 is further configured to, e.g. by means of the determining module 605 configured to, determine how to retransmit the subframe based on the feedback indication by: Determining whether to retransmit the original transmission or to use a new redundancy version, and if determining to use a new redundancy version, select which redundancy version to use for the retransmission of the subframe, based the feedback indication.

In some embodiments, the radio-network node 12 is further configured to, e.g. by means of a selecting module 606 configured to, selecting which redundancy version to use for the retransmission of the subframe, based on the feedback for each subframe of the data transmission in the feedback indication and the number of NACKed subframes out of the number of subframes of the data transmission in the feedback indication.

In some embodiments, the radio-network node is further configured to, e.g. by means of the determining module 605 configured to, determine how to retransmit the subframe by: Selecting which redundancy version to use for the retransmission, based on: (1) the actual number of transmissions made for which HARQ feedback is expected in the feedback indication, (2) the number of ACKed subframes out of the number of subframes of the data transmission in the feedback indication, and (3) the number of NACKed subframes in the feedback indication.

In some embodiments, the radio-network node is further configured to, e.g. by means of the determining module 605 configured to, determine how to retransmit the subframe by: If the number of ACKed plus the number of NACKed subframes equal the actual number of transmissions, then determine that any retransmission is to be made with a new redundancy version, otherwise any retransmissions are made with the previously used redundancy version.

The indicated NACKed subframes out of the number of subframes of the data transmission may in some embodiments be adapted to be indicated by specifying the number of subframes of the data transmission received by the wireless device 10 in the feedback index. The indicated number of NACKed subframes out of the number of subframes is derivable from the number of subframes of the data transmission received by the wireless device 10 minus the number of ACKed subframes out of the subframes of the data transmission.

In these embodiments, the radio-network node is further configured to, e.g. by means of the determining module 605 configured to, determine how to retransmit the subframe by: If the indicated number of subframes of the data transmission received by the wireless device 10 equals the actual number of transmissions transmitted by the radio-network node 12, determining that any retransmission is to be made with new redundancy versions, otherwise any retransmission is to be made with the previously used redundancy version.

Default feedback indicating NACK is to be received from the wireless device 10 for subframes where no control part is detected.

The embodiments herein may be implemented through one or more processors, such as a processing unit 601 in the radio-network node 12 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the radio-network node 12. One such carrier may be in the form of a CD ROM disc. It is however feasible with other data carriers such as a memory stick. The computer program code may furthermore be provided as pure program code on a server and downloaded to the radio-network node 12.

The radio-network node 12 may further comprise a memory 607 comprising one or more memory units. The memory 607 comprises instructions executable by the processing unit 601.

The memory 607 is arranged to be used to store e.g. information, data, configurations, etc. to perform the methods herein when being executed in the radio-network node 12.

In some embodiments, a computer program 608 comprises instructions, which when executed by the at least one processor such as the processing unit 601, cause the at least one processing unit 601 to perform actions according to any of the Actions 400-404.

In some embodiments, a carrier 609 comprises the computer program 608, wherein the carrier is one of an electronic signal, an optical signal, an electromagnetic signal, a magnetic signal, an electric signal, a radio signal, a microwave signal, or a computer-readable storage medium.

FIG. 7 is a schematic block diagram depicting the wireless device. To perform the method actions or handling a data transmission to be transmitted from a radio, the wireless device 10 may comprise the following arrangement depicted in FIG. 7.

The wireless device 10 is configured to, e.g. by means of a receiving module 701 configured to, receive from the radio-network node 12, data over a number of subframes and a respective control part associated with the data of each respective subframe. The respective control part comprises a feedback index, indicating a transmission time of a feedback indication to be sent from the wireless device 10 in a feedback message to be common for the subframes of the data transmission. The feedback index may further be adapted to indicate a position for the feedback indication in the feedback message.

The indication of the transmission time of the feedback message to be sent from the wireless device 10 may comprise a time offset.

The wireless device 10 is configured to, e.g. by means of a transmitting module 702 configured to, transmit to the radio-network node 12 the feedback indication in the feedback message common for the subframes of the data transmission according to the control parts of the transmitted subframes. The feedback indication indicates feedback for each subframe of the data transmission received, and the number of NACKed subframes out of the number of subframes of the data transmission.

In some embodiments the indicated NACKed subframes out of the number of subframes of the data transmission is adapted to be indicated by specifying the number of subframes of the data transmission received by the wireless device 10 in the feedback index. The indicated number of NACKed subframes out of the number of subframes is derivable from the specified number of subframes of the data transmission received by the wireless device 10 minus the number of ACKed subframes out of the subframes of the data transmission.

The wireless device 10 may further be configured to, e.g. by means of the receiving module 701 configured to, receive from the radio-network node 12, a retransmission of any of the number of subframes based on the feedback indication.

The wireless device 10 may further be configured to, e.g. by means of a generating module 707 configured to, generate feedback in the feedback message common for the subframes of the data transmission according to the control parts of the transmitted subframes and in accordance with decoding attempts of each of the received subframes of the data transmission A default feedback value corresponding to NACK is to be generated for subframes in which no control part is detected.

The embodiments herein may be implemented through one or more processors, such as a processing unit 703 in the wireless device 10 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the wireless device 10. One such carrier may be in the form of a CD ROM disc. It is however feasible with other data carriers such as a memory stick. The computer program code may furthermore be provided as pure program code on a server and downloaded to the wireless device 10.

The wireless device 10 may further comprise a memory 704 comprising one or more memory units. The memory 704 comprises instructions executable by the processing unit 703.

The memory 704 is arranged to be used to store e.g. information, data, configurations, etc. to perform the methods herein when being executed in the wireless device 10.

In some embodiments, a computer program 705 comprises instructions, which when executed by the at least one processor such as the processing unit 703, cause the at least one processing unit 703 to perform actions according to any of the Actions 501-505.

In some embodiments, a carrier 706 comprises the computer program 705, wherein the carrier is one of an electronic signal, an optical signal, an electromagnetic signal, a magnetic signal, an electric signal, a radio signal, a microwave signal, or a computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio-network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/ or program or application data, and non-volatile memory.

Other hardware, conventional and/or custom, may also be included. Designers of radio-network nodes will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

Below, some example embodiments are presented:

Referring to FIGS. 1, 4 and 6:

According to a first aspect the object is achieved by a method performed by a radio-network node 12 for handling a data transmission, such as transmission of data in a number of subframes, from the radio-network node 12 to a wireless device 12 in a wireless communication network, the method comprising:

Transmitting 401 data over a number of subframes to the wireless device 10, and e.g. a respective control part, such as a DL grant, associated with the data of each respective subframe, the respective control part comprises a feedback index or a feedback index value, the feedback index is indicating a time or a time offset for a transmission time of a feedback indication e.g. in a feedback message from the wireless device, which feedback message is common for the subframes of the data transmission, the feedback index may also indicate a position for the feedback indication in the feedback message. This Action may be performed by a transmitting module 602 comprised in the radio-network node 12 configured to perform action 401.

Receiving 402 a feedback indication in a feedback message according to the control parts of the transmitted subframes, which feedback indication indicates feedback for each subframe of the data transmission and the number of NACKed subframes out of the number of subframes of the data transmission. This Action may be performed by a receiving module 603 comprised in the radio-network node 12 configured to perform action 402.

Deciding 403 whether or not to retransmit any of the subframes based on the feedback indication. This Action may be performed by a deciding module 604 comprised in the radio-network node 12 configured to perform action 403.

If decided to retransmit any subframe, determine 404 how to retransmit. This Action may be performed by a determining module 605 comprised in the radio-network node 12 configured to perform action 404.

The determining 404 how to retransmit may comprise:

Determine whether it is best to retransmit the original transmission or to use a new redundancy version, and if determining to use a new redundancy version selecting which redundancy version to use for the retransmission, based the feedback indication.

According to some embodiments, the radio-network node 12:

Decides 403 whether or not to retransmit any of the subframes based on feedback for each subframe of the data transmission in the feedback indication, and selects 404 which redundancy version to use for the retransmission, based on the feedback for each subframe of the data transmission in the feedback indication and the number of NACKed subframes out of the number of subframes of the data transmission in the feedback indication.

According to some embodiments the radio-network node 12,

Selects 404 which redundancy version to use for the retransmission, based on (1) the actual number of transmissions made for which HARQ feedback is expected in the feedback indication, and (2) the number of ACKed subframes and the number NACKed subframes out of the number of subframes of the data transmission in the feedback indication.

According to some embodiments, if the number of ACKed plus number of NACKed subframes equal the actual number of transmissions, then any retransmissions are determined to be made with new redundancy versions, otherwise any retransmissions are made with the previously used redundancy version.

Referring to FIGS. 1, 5 and 7:

According to a second aspect the object is achieved by a method performed by a wireless device 10 for handling a data transmission, such as transmission of data in a number of subframes, from a radio-network node 12 to the wireless device in a wireless communication network, the method comprising:

Receiving 501 from the radio-network node, data over a number of subframes and e.g. a respective control part, such as a DL grant, associated with the data of each respective the subframe, the respective control part comprises a feedback index or a feedback index value, the feedback index is indicating a time or a time offset for a transmission time of a feedback indication e.g. in a feedback message from the wireless device, which feedback message is common for the subframes of the data transmission, the feedback index may also indicate a position for the feedback indication in the feedback message. This Action may be performed by a receiving module 701 comprised in the wireless device 10 configured to perform action 501.

Transmitting 504 a feedback indication in a feedback message according to the control parts of the transmitted subframes, which feedback indication indicates feedback for each subframe of the data transmission and the number of NACKed subframes out of the number of subframes of the data transmission. This Action may be performed by a transmitting module 702 comprised in the wireless device 10 configured to perform action 502.

Receiving 505 from the radio-network node, a re-transmission of any of the number of subframes based on the feedback indication. This Action may be performed by the receiving module 701 comprised in the wireless device 10 configured to perform action 503.

Referring to FIGS. 1, and 6:

According to a third aspect the object is achieved by a radio-network node 12 for handling a data transmission, such as transmission of data in a number of subframes, from the radio-network node 12 to a wireless device 12 in a wireless communication network, the radio-network node 12 is configured to:

Transmit data over a number of subframes to the wireless device 10, and e.g. a respective control part, such as a DL grant, associated with the data of each respective the subframe, the respective control part comprises a feedback index or a feedback index value, the feedback index is indicating a time or a time offset for a transmission time of a feedback indication e.g. in a feedback message from the wireless device, which feedback message is common for the subframes of the data transmission, the feedback index may also indicate a position for the feedback indication in the feedback message. This Action may be performed by a transmitting module 602 comprised in the radio-network node 12 configured to perform action 401.

Receive feedback indication in a feedback message according to the control parts of the transmitted subframes, which feedback indication indicates feedback for each subframe of the data transmission and the number of NACKed subframes out of the number of subframes of the data transmission. This Action may be performed by a receiving module 603 comprised in the radio-network node 12 configured to perform action 402.

Decide whether or not to retransmit any of the subframes based on the feedback indication. This Action may be performed by a deciding module 604 comprised in the radio-network node 12 configured to perform action 403.

If decided to retransmit any subframe, determine how to retransmit. This Action may be performed by a determining module 605 comprised in the radio-network node 12 configured to perform action 404.

The radio-network node 12 may further be configured to determine how to retransmit by:

Determining whether it is best to retransmit the original transmission or to use a new redundancy version. This Action may be performed by the determining module 605 comprised in the radio-network node 12.

If determining to use a new redundancy version, selecting which redundancy version to use for the retransmission, based on the feedback indication. This Action may be performed by a selecting module 606 comprised in the radio-network node 12.

According to some embodiments, the radio-network node 12 may further be configured to:

Decide, e.g. by means of the deciding module 604, whether or not to retransmit any of the subframes based on the feedback for each subframe of the data transmission in the feedback indication.

Select, e.g. by means of the selecting module 606, which redundancy version to use for the retransmission, based the feedback for each subframe of the data transmission in the feedback indication and the number of NACKed subframes out of the number of subframes of the data transmission in the feedback indication.

According to some embodiments, the radio-network node 12 may further be configured to:

Select, e.g. by means of the selecting module 606, which redundancy version to use for the retransmission, based on (1) the actual number of transmissions made for which HARQ feedback is expected in the feedback indication, and (2) the number of ACKed subframes and the number of NACKed subframes out of the number of subframes of the data transmission in the feedback indication.

According to some embodiments, if the number of ACKed plus number of NACKed subframes equal the actual number of transmissions, then any retransmissions are determined to be made with new redundancy versions, otherwise any retransmissions are made with the previously used redundancy version.

Referring to FIGS. 1 and 7:

According to a fourth aspect the object is achieved by a wireless device 10 for handling a data transmission, such as transmission of data in a number of subframes, from a radio-network node 12 to the wireless device in a wireless communication network, the wireless device 10 is configured to:

Receive from the radio-network node, data over a number of subframes and e.g. a respective control part, such as a DL grant, associated with the data of each respective the subframe, the respective control part comprises a feedback index or a feedback index value, the feedback index is indicating a time or a time offset for a transmission time of a feedback indication e.g. in a feedback message from the wireless device, which feedback message is common for the subframes of the data transmission, the feedback index may also indicate a position for the feedback indication in the feedback message. This Action may be performed by a receiving module 701 comprised in the wireless device 10 configured to perform action 501.

Transmit a feedback indication in a feedback message according to the control parts of the transmitted subframes, which feedback indication indicates feedback for each subframe of the data transmission and the number of NACKed subframes out of the number of subframes of the data transmission. This Action may be performed by a transmitting module 702 comprised in the wireless device 10 configured to perform action 502.

Receive from the radio-network node, a re-transmission of any of the number of subframes based on the feedback indication. This Action may be performed by the receiving module 701 comprised in the wireless device 10 configured to perform action 503.

The invention claimed is:

1. A method performed by a radio-network node for handling a data transmission from the radio-network node to a wireless device in a wireless communication network, the method comprising:

transmitting, to the wireless device, in each of a plurality of subframes, data and a respective control part, each respective control part comprising a feedback index indicating a transmission time for a feedback indication corresponding to the data to be sent from the wireless device, wherein the feedback indices for the plurality of subframes all refer to a single subframe for the feedback indications;

receiving, from the wireless device, the feedback indications for the data in the plurality of subframes in a feedback message in the single subframe, wherein the feedback indications individually indicate feedback for each of the plurality of subframes and wherein the feedback message comprises one or more bits, in addition to the feedback indications, the one or more bits indicating how many of the feedback indications correspond to Negatively Acknowledged (NACKed) ones of the plurality of subframes; and deciding whether or not to retransmit any of the data in the plurality of subframes, based on the feedback indications.

2. The method of claim 1, wherein each feedback index indicates a time offset.

3. The method of claim 1, wherein each feedback index further indicates a position for the respective feedback indication in the feedback message.

4. The method of claim 1, wherein the method comprises determining to retransmit data from one or more of the plurality of subframes and determining how to retransmit the data based on the feedback indication.

5. The method of claim 4, wherein determining how to retransmit the data based on the feedback indication comprises:

determining whether to retransmit the original transmission or to use a new redundancy version, and if determining to use a new redundancy version, selecting which redundancy version to use for the retransmission of the data, based on the feedback indications.

6. The method of claim 5, wherein determining how to retransmit the data comprises selecting which redundancy version to use for the retransmission of the data, based on the feedback indications and based on the one or more bits indicating how many of the feedback indications correspond to Negatively Acknowledged (NACKed) ones of the plurality of subframes.

7. The method of claim 6, wherein determining how to retransmit the data comprises selecting which redundancy version to use for the retransmission, based on:
the actual number of transmissions made for which HARQ feedback is expected in the feedback indications, and
the number of ACKed subframes in the feedback indications, out of the plurality of subframes, and
the number of NACKed subframes in the feedback indications.

8. The method of claim 4, wherein determining how to retransmit the data comprises:
if the number of ACKed subframes plus the number of NACKed subframes equals the actual number of transmissions, then any retransmission is determined to be made with a new redundancy version, otherwise any retransmissions are made with the previously used redundancy version.

9. The method of claim 1, wherein the number of NACKed subframes out of the plurality of subframes of the data transmission is indicated by specifying, with the one or more bits, the number of subframes of the data transmission correctly received by the wireless device, and wherein the number of NACKed subframes out of the plurality of subframes is derivable from the number of subframes of the data transmission correctly received by the wireless device minus the number of ACKed subframes out of the plurality of subframes.

10. The method of claim 9, wherein determining how to the data comprises:
if the indicated number of subframes of the data transmission correctly received by the wireless device equals the actual number of transmissions transmitted by the radio-network node, determining that any retransmission is to be made with new redundancy versions, otherwise any retransmission is to be made with the previously used redundancy version.

11. The method of claim 1, wherein a feedback indication corresponding to NACK is received from the wireless device for each of the plurality subframes where no control part is detected by the wireless device.

12. A non-transitory computer-readable medium comprising, stored thereupon, a computer program comprising instructions that, when executed by at least one processing unit of a radio-network node, cause the at least one processing unit to perform the actions of claim 1.

13. A method performed by a wireless device for handling a data transmission, from a radio-network node to the wireless device in a wireless communication network, the method comprising:
receiving, from the radio-network node, in each of a plurality of subframes, data and a respective control part, each respective control part comprising a feedback index indicating a transmission time for a feedback indication corresponding to the data to be sent from the wireless device, wherein the feedback indices for the plurality of subframes all refer to a single subframe for the feedback indications; and
transmitting, to the radio-network node the feedback indications for the data in the plurality of subframes in a feedback message in the single subframe, wherein the feedback indications individually indicate feedback for each of the plurality of subframes and wherein the feedback message comprises one or more bits, in addition to the feedback indications, the one or more bits indicating how many of the feedback indications correspond to Negatively Acknowledged (NACKed) ones of the plurality of subframes.

14. The method of claim 13, wherein each feedback index indicates a time offset.

15. The method of claim 13, wherein each feedback index further indicates a position for the feedback indication in the feedback message.

16. The method of claim 13, wherein the number of NACKed subframes out of the plurality of subframes is indicated by specifying, with the one or more bits, the number of subframes of the data transmission correctly received by the wireless device, and wherein the number of NACKed subframes out of the plurality of subframes is derivable from the specified number of subframes of the data transmission correctly received by the wireless device minus the number of ACKed subframes out of the plurality of subframes.

17. The method of claim 13, further comprising:
receiving from the radio-network node, a retransmission of the data of any of the plurality of subframes based on the feedback indications.

18. The method of claim 13, further comprising:
generating the feedback indications in the feedback message common for the subframes of the data transmission according to the control parts of the transmitted subframes and in accordance with decoding attempts of each of the received subframes of the data transmission, wherein a feedback indication corresponding to NACK is generated for each of the plurality of subframes in which no control part is detected.

19. A non-transitory computer-readable medium comprising, stored thereupon, a computer program comprising instructions that, when executed by at least one processing unit of a wireless device, cause the at least one processing unit to perform the actions of claim 13.

20. A radio-network node for handling a data transmission transmitted from the radio-network node to a wireless device in a wireless communication network, the radio-network node comprising a processing circuit and a memory operatively coupled to the processing circuit, wherein the processing circuit and memory are configured to:
transmit, to the wireless device, in each of a plurality of subframes data and a respective control part, each respective control part comprising a feedback index indicating a transmission time for a feedback indication corresponding to the data to be sent from the wireless device, wherein the feedback indices for the plurality of subframes all refer to a single subframe for the feedback indications;
receive, from the wireless device the feedback indications for the data in the plurality of subframes in a feedback message in the single subframe, wherein the feedback indications individually indicate feedback for each of the plurality of subframes and wherein the feedback message comprises one or more bits, in addition to the feedback indications, the one or more bits indicating how many of the feedback indications correspond to Negatively Acknowledged (NACKed) ones of the plurality of subframes; and
decide whether or not to retransmit any of the data in the plurality of subframes, based on the feedback indications.

21. The radio-network node of claim 20, wherein each feedback index indicates a time offset.

22. The radio-network node of claim 20, wherein each feedback index further is adapted to indicate a position for the respective feedback indication in the feedback message.

23. The radio-network node of claim 20, wherein the processing circuit and memory are configured to:
   determine to retransmit data from one or more of the plurality of subframes; and
   determine how to retransmit the data based on the feedback indications.

24. The radio-network node of claim 23, wherein the processing circuit and memory are further configured to determine how to retransmit the data based on the feedback indications by:
   determining whether to retransmit the original transmission or to use a new redundancy version, and
   if determining to use a new redundancy version, select which redundancy version to use for the retransmission of the data, based on the feedback indications.

25. The radio-network node of claim 24, wherein the processing circuit and memory are further configured to determine how to retransmit the data by:
   selecting which redundancy version to use for the retransmission of the data, based on the feedback indications and based on the one or more bits indicating how many of the feedback indications correspond to Negatively Acknowledged (NACKed) ones of the plurality of subframes.

26. The radio-network node of claim 25, wherein the processing circuit and memory are further configured to determine how to retransmit the data by:
   selecting which redundancy version to use for the retransmission, based on:
   the actual number of transmissions made for which HARQ feedback is expected in the feedback indications, and
   the number of ACKed subframes in the feedback indications, out of the plurality of subframes, and the number of NACKed subframes in the feedback indications.

27. The radio-network node of claim 23, wherein the processing circuit and memory are further configured to determine how to retransmit the data by:
   if the number of ACKed subframes plus the number of NACKed subframes equals the actual number of transmissions, then determine that any retransmission is to be made with a new redundancy version, otherwise any retransmissions are made with the previously used redundancy version.

28. The radio-network node of claim 20, wherein the number of NACKed subframes out of the plurality of subframes of the data transmission is indicated by specifying, with the one or more bits, the number of subframes of the data transmission correctly received by the wireless device, and wherein the number of NACKed subframes out of the plurality of subframes is derivable from the number of subframes of the data transmission correctly received by the wireless device minus the number of ACKed subframes out of the plurality of subframes.

29. The radio-network node of claim 28, wherein the processing circuit and memory are further configured to determine how to retransmit the data by:
   if the indicated number of subframes of the data transmission correctly received by the wireless device equals the actual number of transmissions transmitted by the radio-network node, determining that any retransmission is to be made with new redundancy versions, otherwise any retransmission is to be made with the previously used redundancy version.

30. The radio-network node of claim 20, wherein a feedback indication corresponding to NACK is received from the wireless device for each of the plurality subframes where no control part is detected by the wireless device.

31. A wireless device for handling a data transmission transmitted from a radio-network node to the wireless device in a wireless communication network, the wireless device comprising a processing circuit and a memory operatively coupled to the processing circuit, wherein the processing circuit and memory are configured to:
   receive, from the radio-network node, in each of a plurality of subframes, data and a respective control part, each respective control part comprising a feedback index indicating a transmission time for a feedback indication corresponding to the data to be sent from the wireless device, wherein the feedback indices for the plurality of subframes all refer to a single subframe for the feedback indications; and
   transmit to the radio-network node the feedback indications for the data in the plurality of subframes in a feedback message in the single subframe, wherein the feedback indications individually indicate feedback for each of the plurality of subframes and wherein the feedback message comprises one or more bits, in addition to the feedback indications, the one or more bits indicating how many of the feedback indications correspond to Negatively Acknowledged (NACKed) ones of the plurality of subframes.

32. The wireless device of claim 31, wherein each feedback index indicates a time offset.

33. The wireless device of claim 31, wherein each feedback index further indicates a position for the feedback indication in the feedback message.

34. The wireless device of claim 31, wherein the number of NACKed subframes out of the plurality of subframes is indicated by specifying, with the one or more bits, the number of subframes of the data transmission correctly received by the wireless device, and wherein the number of NACKed subframes out of the plurality of subframes is derivable from the specified number of subframes of the data transmission correctly received by the wireless device minus the number of ACKed subframes out of the plurality of subframes.

35. The wireless device of claim 31, wherein the processing circuit and memory are further configured to:
   receive from the radio-network node, a retransmission of the data of any of the plurality of subframes based on the feedback indications.

36. The wireless device of claim 31, wherein the processing circuit and memory are further configured to:
   generate the feedback indications in the feedback message common for the subframes of the data transmission according to the control parts of the transmitted subframes and in accordance with decoding attempts of each of the received subframes of the data transmission, wherein a feedback indication corresponding to NACK is generated for each of the plurality of subframes in which no control part is detected.

* * * * *